United States Patent
Aho et al.

(10) Patent No.: US 9,086,962 B2
(45) Date of Patent: Jul. 21, 2015

(54) AGGREGATING JOB EXIT STATUSES OF A PLURALITY OF COMPUTE NODES EXECUTING A PARALLEL APPLICATION

(75) Inventors: Michael E. Aho, Rochester, MN (US); John E. Attinella, Rochester, MN (US); Thomas M. Gooding, Rochester, MN (US); Michael B. Mundy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/524,602

(22) Filed: Jun. 15, 2012

(65) Prior Publication Data

US 2013/0339805 A1    Dec. 19, 2013

(51) Int. Cl.
G06F 11/07 (2006.01)
G06F 9/52 (2006.01)
G06F 11/30 (2006.01)

(52) U.S. Cl.
CPC .............. *G06F 11/0709* (2013.01); *G06F 9/52* (2013.01); *G06F 11/0715* (2013.01); *G06F 11/0784* (2013.01); *G06F 11/3006* (2013.01); *G06F 11/3055* (2013.01); *G06F 11/3082* (2013.01); *G06F 2201/865* (2013.01)

(58) Field of Classification Search
CPC ...... G04G 15/006; G06F 1/14; H04L 67/325; H04J 3/0602
USPC ............ 718/104, 103; 713/310; 709/229, 248
See application file for complete search history.

(56) References Cited

U.S. PATENT DOCUMENTS

| | | | | |
|---|---|---|---|---|
| 5,937,201 | A * | 8/1999 | Matsushita et al. | 713/310 |
| 6,763,519 | B1 * | 7/2004 | McColl et al. | 718/100 |
| 2003/0140172 | A1 * | 7/2003 | Woods et al. | 709/248 |
| 2007/0255835 | A1 * | 11/2007 | Coppinger et al. | 709/226 |
| 2009/0006808 | A1 * | 1/2009 | Blumrich et al. | 712/12 |
| 2009/0113438 | A1 * | 4/2009 | Barness et al. | 718/103 |
| 2010/0293551 | A1 * | 11/2010 | Ajima et al. | 718/104 |

OTHER PUBLICATIONS

Budnik et al., "High Throughput Computing on IBM's Blue Gene/P", www.ibm.com [online] [accessed online Jan. 6, 2012], 18 pp., URL: http://www-03.ibm.com/systems/resources/HTC_WhitePaper_V2_050508.pdf.

\* cited by examiner

*Primary Examiner* — Bryce Bonzo
*Assistant Examiner* — Jeison C Arcos
(74) *Attorney, Agent, or Firm* — Kennedy Lenart Spraggins LLP

(57) ABSTRACT

Aggregating job exit statuses of a plurality of compute nodes executing a parallel application, including: identifying a subset of compute nodes in the parallel computer to execute the parallel application; selecting one compute node in the subset of compute nodes in the parallel computer as a job leader compute node; initiating execution of the parallel application on the subset of compute nodes; receiving an exit status from each compute node in the subset of compute nodes, where the exit status for each compute node includes information describing execution of some portion of the parallel application by the compute node; aggregating each exit status from each compute node in the subset of compute nodes; and sending an aggregated exit status for the subset of compute nodes in the parallel computer.

20 Claims, 8 Drawing Sheets

AGGREGATING JOB EXIT STATUSES OF A PLURALITY OF COMPUTE NODES EXECUTING A PARALLEL APPLICATION

STATEMENT REGARDING FEDERALLY SPONSORED RESEARCH OR DEVELOPMENT

This invention was made with Government support under Contract No. B579040 awarded by the Department of Energy. The Government has certain rights in this invention.

BACKGROUND OF THE INVENTION

1. Field of the Invention

The field of the invention is data processing, or, more specifically, methods, apparatus, and products for aggregating job exit statuses of a plurality of compute nodes executing a parallel application.

2. Description of Related Art

The development of the Atanasoff-Berry Computer of 1939 is often cited as the beginning of the computer era. Since that time, computer systems have evolved into extremely complicated devices. Today's computers are much more sophisticated than early systems such as the original Atanasoff-Berry Computer. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can frequently execute a single program in parallel using a plurality of program execution components. When executing a program in parallel there are many tasks that are running simultaneously. Each task has an exit status identifying details related to the execution of a parallel application on a particular machine.

SUMMARY OF THE INVENTION

Methods, apparatus, and products for aggregating job exit statuses of a plurality of compute nodes executing a parallel application, including: identifying, by a parallel computer control system, a subset of compute nodes in the parallel computer to execute the parallel application; selecting, by the parallel computer control system, one compute node in the subset of compute nodes in the parallel computer as a job leader compute node; initiating, by the parallel computer control system, execution of the parallel application on the subset of compute nodes; receiving, by the job leader compute node, an exit status from each compute node in the subset of compute nodes, wherein the exit status for each compute node includes information describing execution of some portion of the parallel application by the compute node; aggregating, by the job leader compute node, each exit status from each compute node in the subset of compute nodes; and sending, by the job leader compute node to the parallel computer control system, an aggregated exit status for the subset of compute nodes in the parallel computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
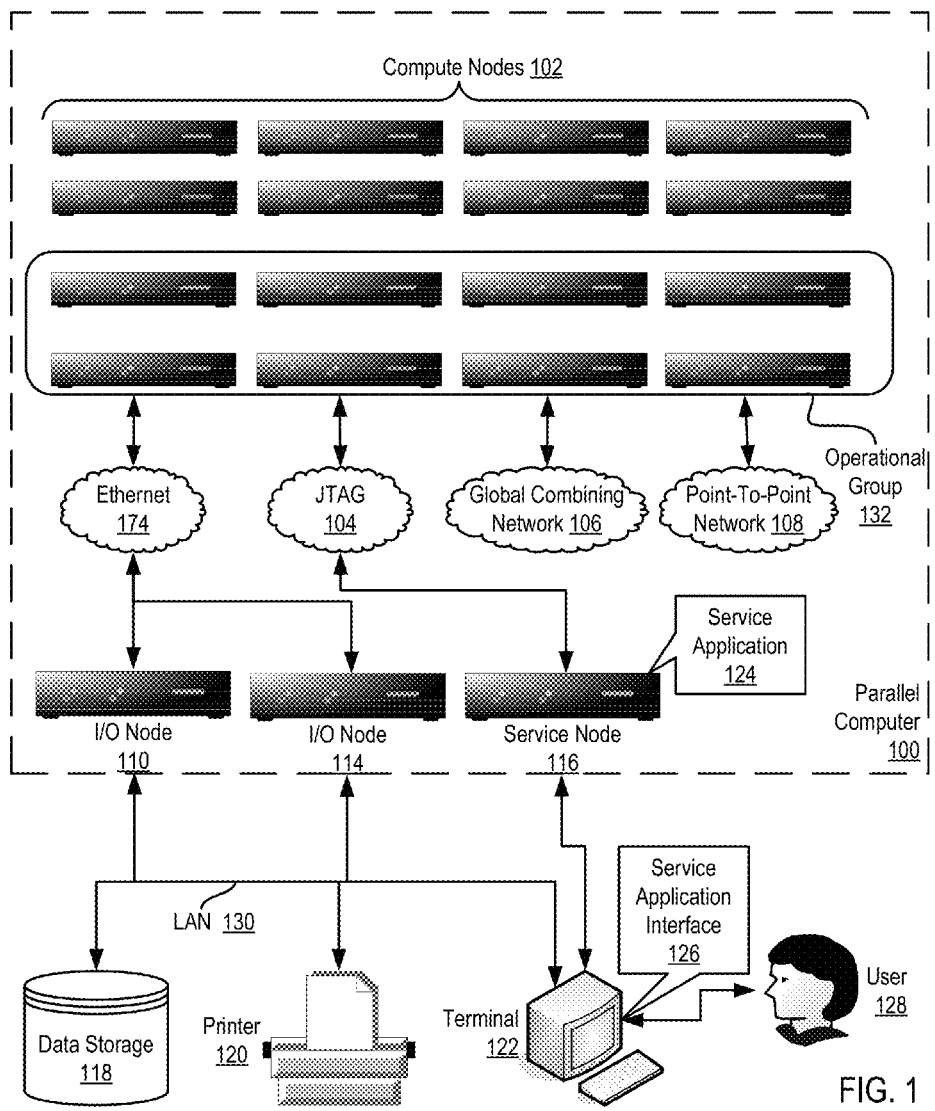
FIG. 1 illustrates an example system for aggregating job exit statuses of a plurality of compute nodes executing a parallel application according to embodiments of the present invention.

Example methods, apparatus, and products for aggregating job exit statuses of a plurality of compute nodes executing a parallel application in accordance with the present invention are described with reference to the accompanying drawings, beginning with FIG. 1. FIG. 1 illustrates an example system for aggregating job exit statuses of a plurality of compute nodes executing a parallel application according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for aggregating job exit statuses of a plurality of compute nodes executing a parallel application according to embodiments of the present invention. In the example of FIG. 1, the parallel computer (100) represents an example of a computing system in which job exit statuses of a plurality of compute nodes executing a parallel application may be aggregated. The parallel application of FIG. 1 represents an application that may be executed a piece at a time on many different processing devices such as compute nodes (102). The results generated by each compute node that executes a particular piece of the parallel application may be aggregated, such that execution of the parallel application produces the same results that would have been achieved if the entire application was executed on a single processing device.

The parallel computer (100) of FIG. 1 can aggregate job exit statuses of a plurality of compute nodes executing a parallel application by identifying, by a parallel computer control system, a subset of compute nodes in the parallel computer (100) to execute the parallel application. The parallel computer control system of FIG. 1 may be embodied, for example, as a module of computer program instructions executing on computer hardware. The parallel computer control system may carry out various functions designed to manage the operation of compute nodes (102) within a parallel computer (100) such as, for example, determining which compute nodes will execute a particular task, monitoring the health of the compute nodes, and so on. The parallel computer control system may identify a subset of compute nodes in the parallel computer (100) to execute the parallel application, for example, by selecting compute nodes in the parallel computer (100) that are currently underutilized, by selecting compute nodes in the parallel computer (100) that have the necessary hardware or software resources to execute the parallel application, and so on.

The parallel computer (100) of FIG. 1 can further aggregate job exit statuses of a plurality of compute nodes executing a parallel application by selecting, by the parallel computer control system, one compute node in the subset of compute nodes in the parallel computer (100) as a job leader compute node. The job leader compute node is one of the compute nodes in the selected subset of compute nodes in the parallel computer (100). The job leader compute node operates somewhat differently than the other compute nodes in the selected subset of compute nodes as the job leader compute node is responsible for carrying out administrative aspects of executing the parallel application. For example, the job leader compute node may be responsible for retrieving the parallel application from memory in the parallel computer (100), sending the parallel application to other compute nodes in the selected subset of compute nodes, sending necessary configuration information to the compute nodes in the selected subset of compute nodes, validating that the compute nodes in the selected subset of compute nodes have executed the parallel application properly, and so on.

Selecting one compute node in the subset of compute nodes in the parallel computer (100) as a job leader compute node may be carried out in many ways as will occur to those of skill in the art. For example, selecting one compute node in the subset of compute nodes in the parallel computer (100) as a job leader compute node may be carried out by randomly selecting one compute node as a job leader compute node, by using a selection algorithm that selects a compute node that has most recently been selected as a job leader compute node, by using a selection algorithm that selects a compute node that has least recently been selected as a job leader compute node, and so on. In addition, selecting one compute node in the subset of compute nodes in the parallel computer (100) as a job leader compute node may be carried out by identifying the compute node in the parallel computer (100) that has the highest amount of available network bandwidth, by identifying a compute node that has the fewest number of average network hops between itself and the other compute nodes, and so on.

The parallel computer (100) of FIG. 1 can further aggregate job exit statuses of a plurality of compute nodes executing a parallel application by initiating, by the parallel computer control system, execution of the parallel application on the subset of compute nodes. Initiating execution of the parallel application on the subset of compute nodes may be carried out, for example, by sending an instruction to execute the parallel application to the job leader compute node along with and any input parameters for the parallel application, by the job leader compute node distributing portions of the parallel application to each compute node for execution, and so on.

The parallel computer (100) of FIG. 1 can further aggregate job exit statuses of a plurality of compute nodes executing a parallel application by receiving, by the job leader compute node, an exit status from each compute node in the subset of compute nodes. The exit status for each compute node includes information describing execution of some portion of the parallel application by the compute node that sent the exit status. The exit status may include, for example, information indicating that a particular compute node executed some portion of the parallel application without encountering an error, information indicating that a particular compute node encountered an error when executing some portion of the parallel application, information identifying the particular error that was encountered during execution of the parallel application, the values of certain application variables at the time an error was encountered, and so on. Each compute node that is executing some portion of the parallel application may send its exit status to the job leader compute node regardless of whether execution of some portion of the parallel application terminated with an error or without an error.

The parallel computer (100) of FIG. 1 can further aggregate job exit statuses of a plurality of compute nodes executing a parallel application by aggregating, by the job leader compute node, each exit status from each compute node in the subset of compute nodes. Aggregating each exit status from each compute node in the subset of compute nodes may be carried out, for example, by identifying the most severe error that occurred during execution of the parallel application on the compute nodes, by combining each exit status from each compute node into a single data structure or exit status, and so on. Aggregating each exit status from each compute node in the subset of compute nodes results in the creation of an aggregated exit status for the subset of compute nodes in the parallel computer (100).

The parallel computer (100) of FIG. 1 can further aggregate job exit statuses of a plurality of compute nodes executing a parallel application by sending, by the job leader compute node to the parallel computer control system, an aggregated exit status for the subset of compute nodes in the parallel computer (100). Sending the aggregated exit status for the subset of compute nodes in the parallel computer (100) to the parallel computer control system may be carried out by transmitting the aggregated exit status over any data communications link between the job leader compute node to the parallel computer control system. The aggregated exit status may be utilized by the parallel computer control system to determine whether the parallel application was properly executed, to identify compute nodes that did not successfully execute the parallel application, to identify compute nodes that should be excluded from executing the parallel application, to resolve problems that occurred during execution of the parallel application, and so on.

Aggregating job exit statuses of a plurality of compute nodes executing a parallel application in a parallel computer is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
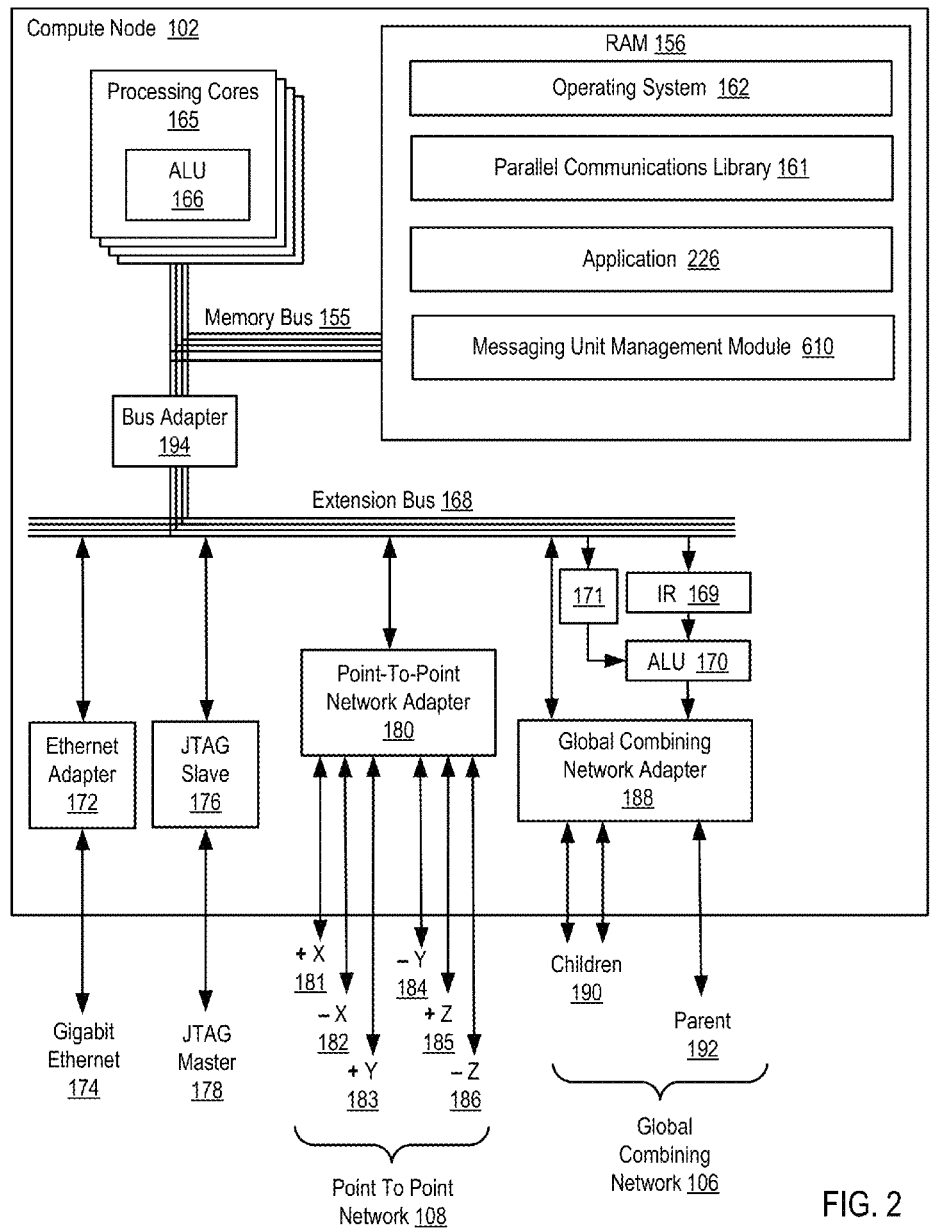
FIG. 2 sets forth a block diagram of an example compute node useful in a parallel computer capable of aggregating job exit statuses of a plurality of compute nodes executing a parallel application according to embodiments of the present invention.

For further explanation, FIG. 2 sets forth a block diagram of an example compute node (102) useful in a parallel computer capable of aggregating job exit statuses of a plurality of compute nodes executing a parallel application according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an application (226). The application (226) in the example of FIG. 2 may be configured as one instance of a parallel application with other instances executing amongst a plurality of compute nodes organized into an operational group. The results generated by each compute node that executes a particular piece of the parallel application (226) may be aggregated, such that execution of the parallel application (226) produces the same results that would have been achieved if the entire application (226) was executed on a single processing device.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of aggregating job exit statuses of a plurality of compute nodes executing a parallel application include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of aggregating job exit statuses of a plurality of compute nodes executing a parallel application.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
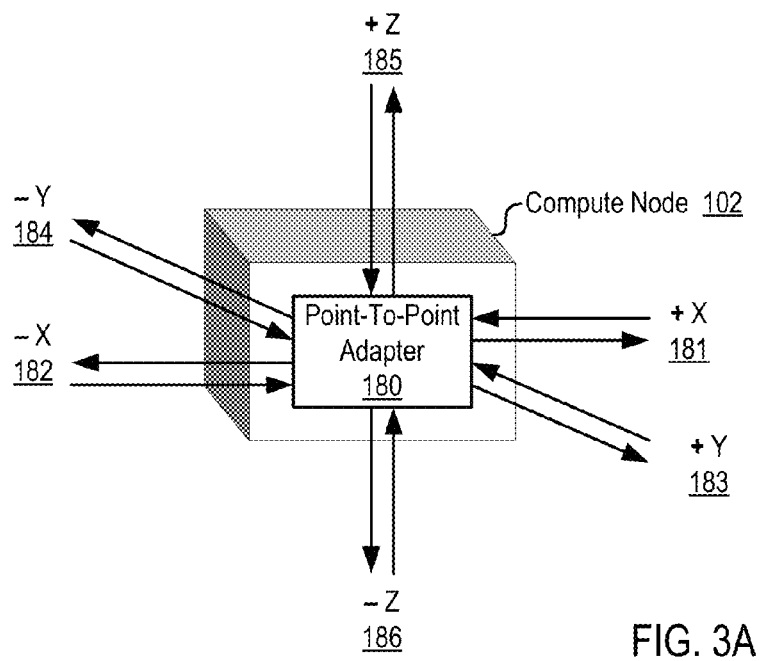
FIG. 3A sets forth a block diagram of an example Point-To-Point Adapter useful in systems capable of aggregating job exit statuses of a plurality of compute nodes executing a parallel application according to embodiments of the present invention.

For further explanation, FIG. 3A sets forth a block diagram of an example Point-To-Point Adapter (180) useful in systems capable of aggregating job exit statuses of a plurality of compute nodes executing a parallel application according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
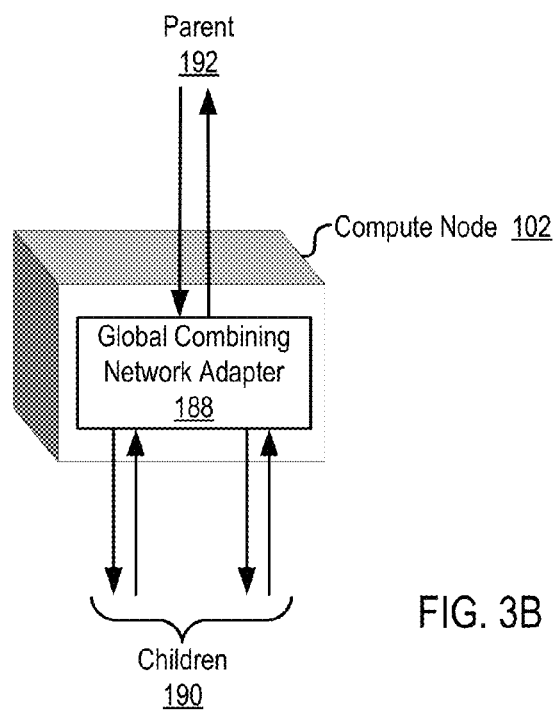
FIG. 3B sets forth a block diagram of an example Global Combining Network Adapter useful in systems capable of aggregating job exit statuses of a plurality of compute nodes executing a parallel application according to embodiments of the present invention.

For further explanation, FIG. 3B sets forth a block diagram of an example Global Combining Network Adapter (188) useful in systems capable of aggregating job exit statuses of a plurality of compute nodes executing a parallel application according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
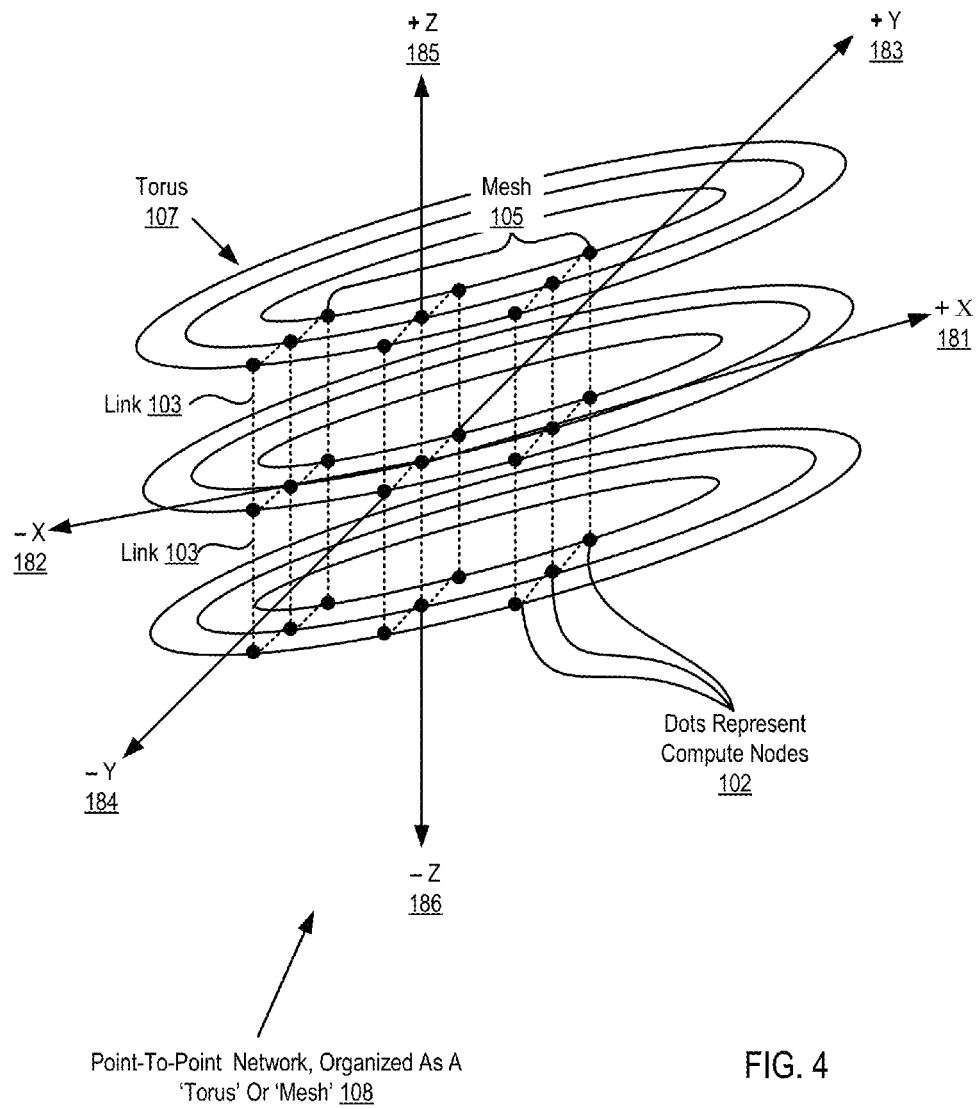
FIG. 4 sets forth a line drawing illustrating an example data communications network optimized for point-to-point operations useful in systems capable of aggregating job exit statuses of a plurality of compute nodes executing a parallel application according to embodiments of the present invention.

For further explanation, FIG. 4 sets forth a line drawing illustrating an example data communications network (108) optimized for point-to-point operations useful in systems capable of aggregating job exit statuses of a plurality of compute nodes executing a parallel application according to embodiments of the present invention. In the example of FIG.

4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in aggregating job exit statuses of a plurality of compute nodes executing a parallel application in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in aggregating job exit statuses of a plurality of compute nodes executing a parallel application in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
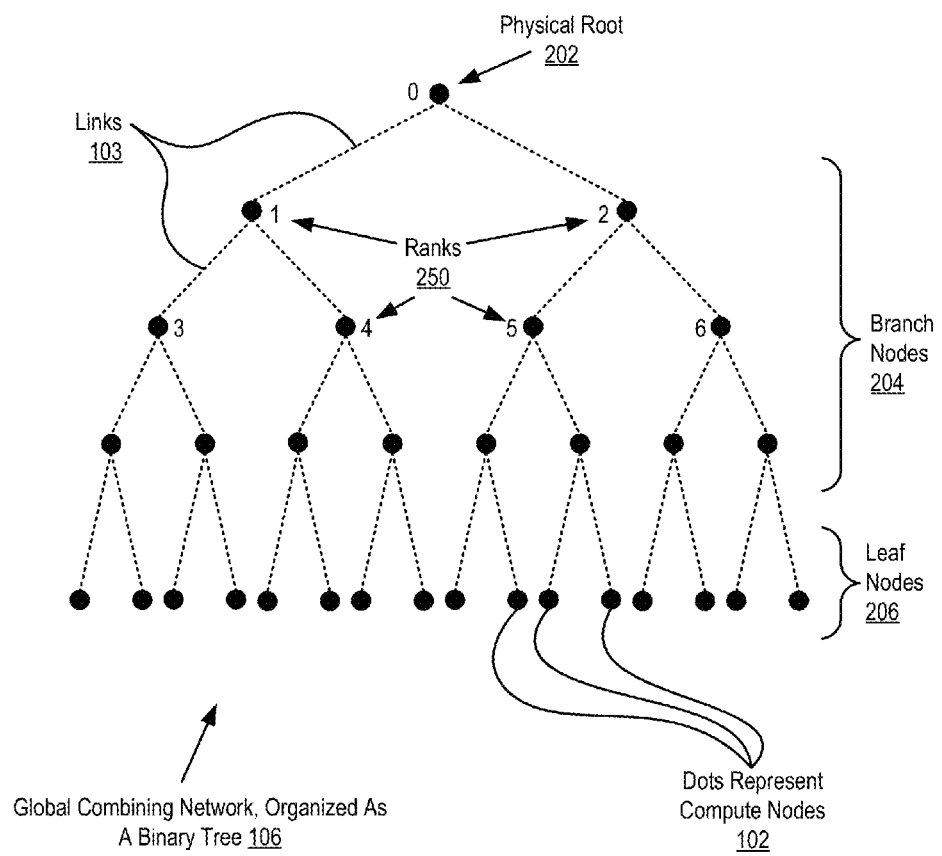
FIG. 5 sets forth a line drawing illustrating an example global combining network useful in systems capable of aggregating job exit statuses of a plurality of compute nodes executing a parallel application according to embodiments of the present invention.

For further explanation, FIG. 5 sets forth a line drawing illustrating an example global combining network (106) useful in systems capable of aggregating job exit statuses of a plurality of compute nodes executing a parallel application according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in aggregating job exit statuses of a plurality of compute nodes executing a parallel application in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
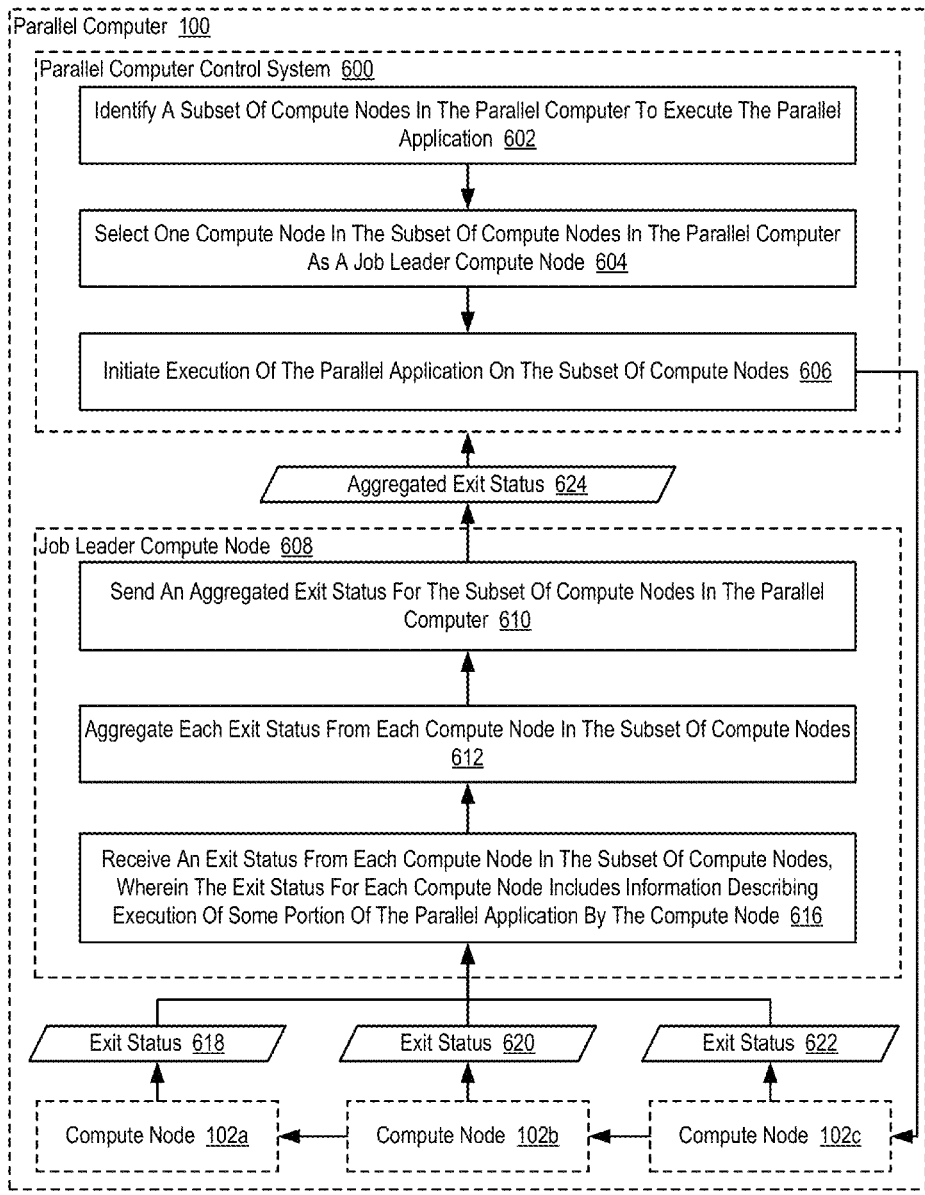
FIG. 6 sets forth a flow chart illustrating an example method for aggregating job exit statuses of a plurality of compute nodes executing a parallel application according to embodiments of the present invention.

For further explanation, FIG. 6 sets forth a flow chart illustrating an example method for aggregating job exit statuses of a plurality of compute nodes (102*a*, 102*b*, 102*c*, 608) executing a parallel application according to embodiments of the present invention. The parallel application of FIG. 6 represents an application that may be executed a piece at a time on many different processing devices such as compute nodes (102*a*, 102*b*, 102*c*, 608). The results generated by each compute node (102*a*, 102*b*, 102*c*, 608) that executes a particular piece of the parallel application may be aggregated, such that execution of the parallel application produces the same results that would have been achieved if the entire application was executed on a single processing device.

The example method of FIG. 6 includes identifying (602), by a parallel computer control system (600), a subset of compute nodes (102*a*, 102*b*, 102*c*, 608) in the parallel computer (100) to execute the parallel application. The parallel computer control system (600) of FIG. 6 may be embodied, for example, as a module of computer program instructions executing on computer hardware. The parallel computer control system (600) may carry out various functions designed to manage the operation of compute nodes within a parallel computer such as, for example, determining which compute nodes will execute a particular task, monitoring the health of the compute nodes, and so on. In the example method of FIG. 6, the parallel computer control system (600) may identify (602) a subset of compute nodes (102*a*, 102*b*, 102*c*, 608) in the parallel computer (100) to execute the parallel application, for example, by selecting compute nodes in the parallel computer (100) that are currently underutilized, by selecting compute nodes in the parallel computer (100) that have the necessary hardware or software resources to execute the parallel application, and so on.

The example method of FIG. 6 also includes selecting (604), by the parallel computer control system (600), one compute node in the subset of compute nodes (102*a*, 102*b*, 102*c*, 608) in the parallel computer (100) as a job leader compute node (608). In the example method of FIG. 6, the job leader compute node (608) is one of the compute nodes (102*a*, 102*b*, 102*c*, 608) in the selected subset of compute nodes in the parallel computer (100). The job leader compute node (608) operates somewhat differently than the other compute nodes (102*a*, 102*b*, 102*c*, 608) in the selected subset of compute nodes as the job leader compute node (608) is responsible for carrying out administrative aspects of executing the parallel application. For example, the job leader compute node (608) may be responsible for retrieving the parallel application from memory in the parallel computer (100), sending the parallel application to other compute nodes (102a, 102b, 102c) in the selected subset of compute nodes, sending necessary configuration information to the compute nodes (102a, 102b, 102c) in the selected subset of compute nodes, validating that the compute nodes (102a, 102b, 102c) in the selected subset of compute nodes have executed the parallel application properly, and so on.

In the example method of FIG. 6, selecting (604) one compute node in the subset of compute nodes (102a, 102b, 102c, 608) in the parallel computer (100) as a job leader compute node (608) may be carried out in many ways as will occur to those of skill in the art. For example, selecting (604) one compute node in the subset of compute nodes (102a, 102b, 102c, 608) in the parallel computer (100) as a job leader compute node (608) may be carried out by randomly selecting one compute node as a job leader compute node (608), by using a selection algorithm that selects a compute node that has most recently been selected as a job leader compute node (608), by using a selection algorithm that selects a compute node that has least recently been selected as a job leader compute node (608), and so on. In addition, selecting (604) one compute node in the subset of compute nodes (102a, 102b, 102c, 608) in the parallel computer (100) as a job leader compute node (608) may be carried out by identifying the compute node in the parallel computer (100) that has the highest amount of available network bandwidth, by identifying a compute node that has the fewest number of average network hops between itself and the other compute nodes (102a, 102b, 102c), and so on.

The example method of FIG. 6 also includes initiating (606), by the parallel computer control system (600), execution of the parallel application on the subset of compute nodes (102a, 102b, 102c, 608). Initiating (606) execution of the parallel application on the subset of compute nodes (102a, 102b, 102c, 608) may be carried out, for example, by sending an instruction to execute the parallel application to the job leader compute node (608) along with and any input parameters for the parallel application, by the job leader compute node (608) distributing portions of the parallel application to each compute node (102a, 102b, 102c) for execution, and so on. The example method of FIG. 6 also includes receiving (616), by the job leader compute node (608), an exit status (618, 620, 622) from each compute node (102a, 102b, 102c) in the subset of compute nodes. In the example method of FIG. 6, the exit status (618, 620, 622) for each compute node (102a, 102b, 102c) includes information describing execution of some portion of the parallel application by the compute node (102a, 102b, 102c) that sent the exit status (618, 620, 622). The exit status (618, 620, 622) may include, for example, information indicating that a particular compute node (102a, 102b, 102c) executed some portion of the parallel application without encountering an error, information indicating that a particular compute node (102a, 102b, 102c) encountered an error when executing some portion of the parallel application, information identifying the particular error that was encountered during execution of the parallel application, the values of certain application variables at the time an error was encountered, and so on. In the example method of FIG. 6, each compute node (102a, 102b, 102c) that is executing some portion of the parallel application may send its exit status (618, 620, 622) to the job leader compute node (608) regardless of whether execution of some portion of the parallel application terminated with an error or without an error.

The example method of FIG. 6 also includes aggregating (612), by the job leader compute node (608), each exit status (618, 620, 622) from each compute node (102a, 102b, 102c) in the subset of compute nodes. Aggregating (612) each exit status (618, 620, 622) from each compute node (102a, 102b, 102c) in the subset of compute nodes may be carried out, for example, by identifying the most severe error that occurred during execution of the parallel application on the compute nodes (102a, 102b, 102c), by combining each exit status (618, 620, 622) from each compute node (102a, 102b, 102c) into a single data structure or exit status, and so on. In the example method of FIG. 6, aggregating (612) each exit status (618, 620, 622) from each compute node (102a, 102b, 102c) in the subset of compute nodes results in the creation of an aggregated exit status (624) for the subset of compute nodes (102a, 102b, 102c) in the parallel computer (100).

The example method of FIG. 6 also includes sending (610), by the job leader compute node (608) to the parallel computer control system (600), an aggregated exit status (624) for the subset of compute nodes (102a, 102b, 102c) in the parallel computer (100). Sending (610) the aggregated exit status (624) for the subset of compute nodes (102a, 102b, 102c) in the parallel computer (100) to the parallel computer control system (600) may be carried out by transmitting the aggregated exit status (624) over any data communications link between the job leader compute node (608) to the parallel computer control system (600). In the example method of FIG. 6, the aggregated exit status (624) may be utilized by the parallel computer control system (600) to determine whether the parallel application was properly executed, to identify compute nodes that did not successfully execute the parallel application, to identify compute nodes that should be excluded from executing the parallel application, to resolve problems that occurred during execution of the parallel application, and so on.

Figure 7:
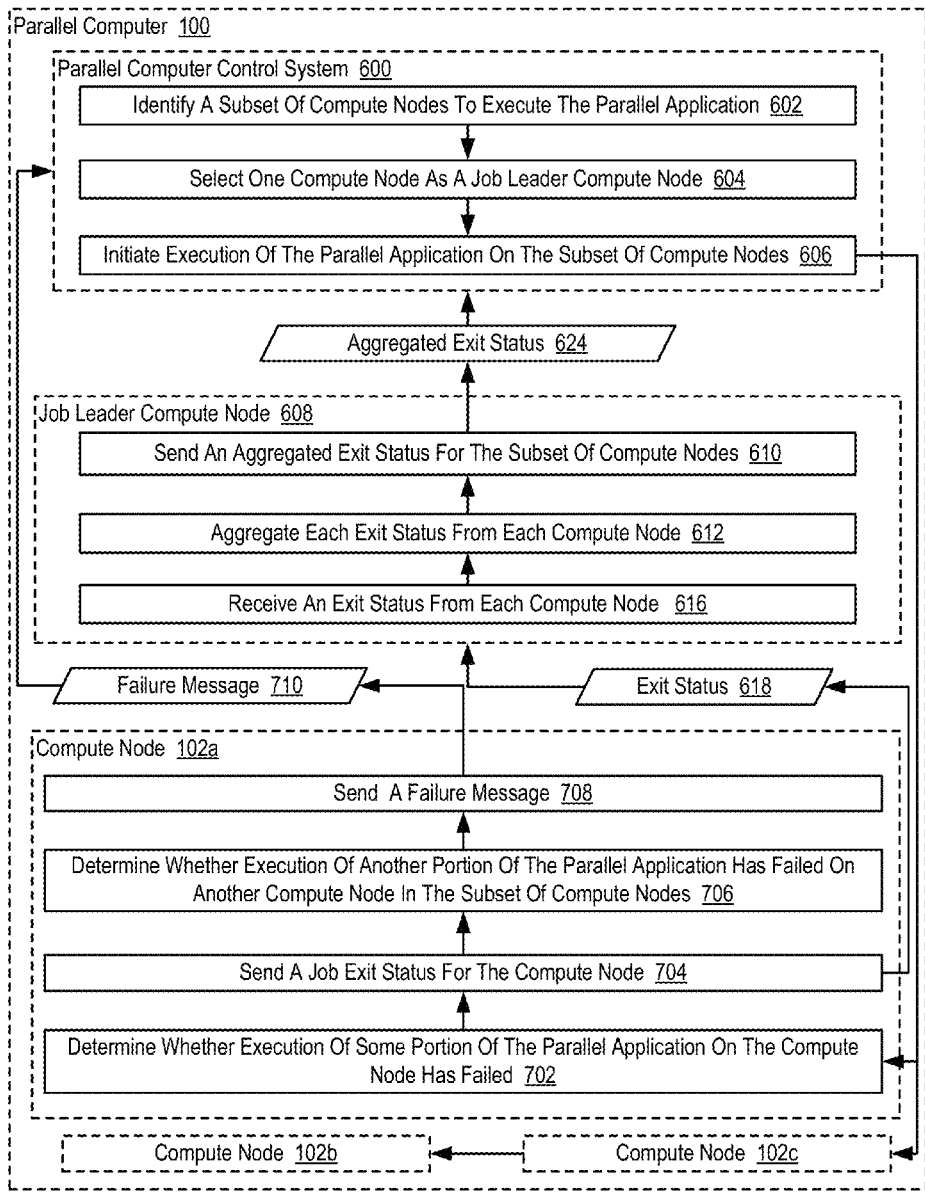
FIG. 7 sets forth a flow chart illustrating an example method for aggregating job exit statuses of a plurality of compute nodes executing a parallel application according to embodiments of the present invention.

For further explanation, FIG. 7 sets forth a flow chart illustrating a further example method for aggregating job exit statuses of a plurality of compute nodes (102a, 102b, 102c, 608) executing a parallel application according to embodiments of the present invention. The example method of FIG. 7 is similar to the example method of FIG. 6 as it also includes identifying (602) a subset of compute nodes (102a, 102b, 102c, 608) in the parallel computer (100) to execute the parallel application, selecting (604) one compute node in the subset of compute nodes (102a, 102b, 102c, 608) in the parallel computer (100) as a job leader compute node (608), initiating (606) execution of the parallel application on the subset of compute nodes (102a, 102b, 102c, 608), receiving (616) an exit status (618, 620, 622) from each compute node (102a, 102b, 102c) in the subset of compute nodes, aggregating (612) each exit status (618, 620, 622) from each compute node (102a, 102b, 102c) in the subset of compute nodes, and sending (610) an aggregated exit status (624) for the subset of compute nodes (102a, 102b, 102c) in the parallel computer (100).

The example method of FIG. 7 also includes determining (702), by a compute node (102a) in the parallel computer (100), whether execution of some portion of the parallel application on the compute node (102a) has failed. In the example method of FIG. 6, determining (702) whether execution of some portion of the parallel application on the compute node (102a) has failed may be carried out, for example, by inspecting an exit status for the compute node (102a), by inspecting error logs related to the execution of the parallel application on the compute node (102a), by checking return values and the values of execution parameters and variables associated with the parallel application on the compute node (102a), and so on.

The example method of FIG. 7 also includes sending (704), by the compute node (102a) to the job leader compute node (608), an exit status (618) for the compute node (102a). In the example method of FIG. 7, sending (704) a exit status (618) for the compute node (102a) to the job leader compute node (608) is carried out in response to determining that execution of some portion of the parallel application on the compute node has failed. The exit status (618) may include, for example, information identifying the particular error that was encountered during execution of the parallel application, the values of certain application variables at the time an error was encountered, and so on.

The example method of FIG. 7 also includes determining (706), by the compute node (102a), whether execution of another portion of the parallel application has failed on another compute node (102b, 102c) in the subset of compute nodes. In the example method of FIG. 7, the compute node (102a) may determine (706) whether execution of another portion of the parallel application has failed on another compute node (102b, 102c) in the subset of compute nodes, for example, by receiving exit status information for the other compute nodes (102b, 102c) in the subset of compute nodes from the job leader compute node (608).

Consider an example in which three compute nodes (102a, 102b, 102c) are executing a parallel application, with each compute node (102a, 102b, 102c) responsible for executing a particular piece of the parallel application. Assume in this example that the job leader compute node (608) maintains a single integer value, which is initially set to '0,' representing the aggregated job exit status for each compute node (102a, 102b, 102c) responsible for executing a particular piece of the parallel application. In such an example, assume that after each compute node (102a, 102b, 102c) has executed its piece of the parallel application, the compute node (102a, 102b, 102c) sends an integer value to the job leader compute node (608) that represents its job exit status. A value of '0' indicates that the compute node (102a, 102b, 102c) has executed its piece of the parallel application without encountering an error. All values other than '0,' however, correspond to a particular error code associated with a particular type of error that was encountered by the compute node (102a, 102b, 102c) during the execution of its piece of the parallel application.

In such an example, a particular compute node (102a) that has executed its piece of the parallel application may send its exit status value to the job leader compute node (608). Upon receipt of the exit status by the job leader compute node (608), the job leader compute node (608) may compare the single integer value that represents the aggregated job exit status for each compute node (102a, 102b, 102c) to the integer value representing the exit status of the particular compute node (102a). If the value integer value representing the exit status of the particular compute node (102a) is greater than the single integer value that represents the aggregated job exit status for each compute node (102a, 102b, 102c), the job leader compute node (608) may set the value of the single integer value that represents the aggregated job exit status for each compute node (102a, 102b, 102c) to the value of the exit status of the particular compute node (102a). For example, if the integer value that represents the aggregated job exit status for each compute node (102a, 102b, 102c) was '0' and the integer value representing the exit status of the particular compute node (102a) was '10,' the job leader compute node (608) may set single integer value that represents the aggregated job exit status for each compute node (102a, 102b, 102c) to '10.'

Prior to updating the aggregated job exit status for each compute node (102a, 102b, 102c) with the exit status from the particular compute node (102a), the job leader compute node (608) may send the single integer value that represents the aggregated job exit status for each compute node (102a, 102b, 102c) to the particular compute node (102a) whose exit status was received. The single integer value that represents the aggregated job exit status for each compute node (102a, 102b, 102c) may be used by the particular compute node (102a) to determining (706) whether execution of another portion of the parallel application has failed on another compute node (102b, 102c) in the subset of compute nodes. For example, if the particular compute node (102a) that sent its exit status receives a return value of '0' from the job leader compute node (608), this indicates that no other compute node (102b, 102c) has submitted a job exit status that is not '0.' As such, the particular compute node (102a) that sent its exit status is clearly the first compute node (102a) that has reported an error during the execution of the parallel application. If, however, the particular compute node (102a) that sent its exit status receives a return value other than '0' from the job leader compute node (608), this indicates that another compute node (102b, 102c) has submitted a job exit status that is not '0.' As such, the particular compute node (102a) that sent its exit status is not the first compute node (102a) that has reported an error during the execution of the parallel application.

The example method of FIG. 7 also includes sending (708), from the compute node (102a) to the parallel computer control system (600), a failure message (710). In the example method of FIG. 7, sending (708) a failure message (710) to the parallel computer control system (600) is carried out in response to determining that execution of another portion of the parallel application has not failed on another compute node (102b, 102c). Stated differently, sending (708) a failure message (710) to the parallel computer control system (600) is carried out in response to determining that the compute node (102a) was the first compute node (102a) to experience an error while executing the parallel application. The failure message (710) of FIG. 7 may include, for example, an identification of the compute node (102a) sending the message, a job exit status value that may be used by the parallel computer control system (600) to identify the nature of the error experienced by the compute node (102a), and so on. In response to receiving the failure message (710), the parallel computer control system (600) may take certain actions such as instructing all the other compute nodes (102b, 102c) that are executing the parallel application to cease executing the parallel application.

Figure 8:
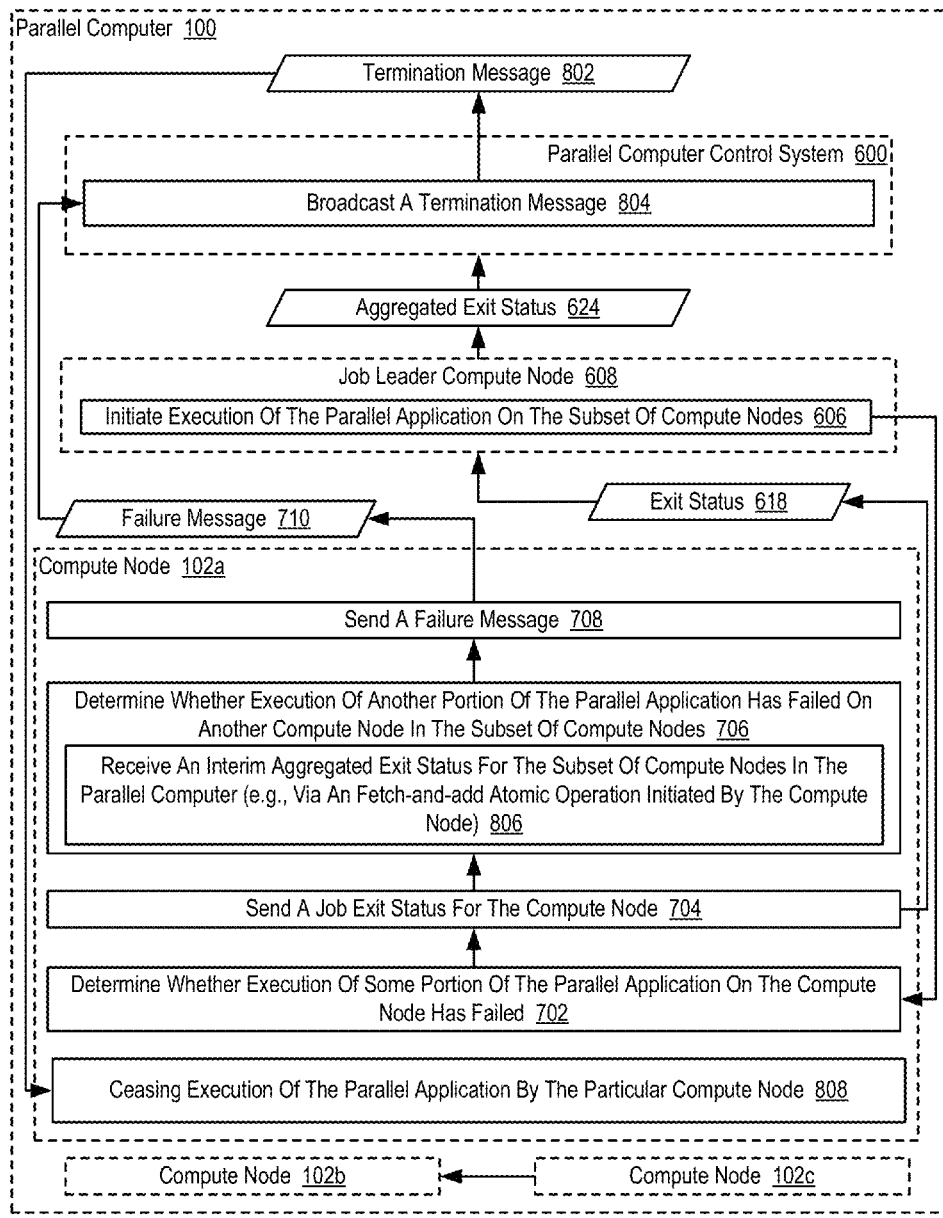
FIG. 8 sets forth a flow chart illustrating an example method for aggregating job exit statuses of a plurality of compute nodes executing a parallel application according to embodiments of the present invention.

For further explanation, FIG. 8 sets forth a flow chart illustrating a further example method for aggregating job exit statuses of a plurality of compute nodes (102a, 102b, 102c, 608) executing a parallel application according to embodiments of the present invention. The example method of FIG. 8 is similar to the example method of FIG. 7 as it also includes determining (702) whether execution of some portion of the parallel application on the compute node (102a) has failed, sending (704) a job exit status (618) for the compute node (102a), determining (706) whether execution of another portion of the parallel application has failed on another compute node (102b, 102c) in the subset of compute nodes, and sending (708) a failure message (710).

In the example method of FIG. 8, determining (706) whether execution of another portion of the parallel application has failed on another compute node (102b, 102c) in the subset of compute nodes can include receiving (806), by the compute node (102a), an interim aggregated exit status for the subset of compute nodes in the parallel computer (100). The interim aggregated exit status for the subset of compute nodes in the parallel computer (100) represents the aggregated exit status for the subset of compute nodes in the parallel computer (100) prior to the point at which the job leader compute node (608) has received an exit status for all compute nodes that executed some portion of the parallel application. In the example method of FIG. 8, the interim aggregated exit status for the subset of compute nodes in the parallel computer (100) may be utilized to determine whether another portion of the parallel application has failed on another compute node (102b, 102c). For example, if the interim aggregated exit status for the subset of compute nodes in the parallel computer (100) has a value of '0,' no compute nodes have returned an exit status indicating that a portion of the parallel application has failed to execute without error. Alternatively, if the interim aggregated exit status for the subset of compute nodes in the parallel computer (100) has a value other than '0,' one or more compute nodes have returned an exit status indicating that a portion of the parallel application has failed to execute.

In the example method of FIG. 8, the interim aggregated exit status for the subset of compute nodes in the parallel computer (100) may be received by the compute node (102a) as the result of a fetch-and-add atomic operation initiated by the compute node (102a). A fetch-and-add atomic operation is an atomic operation that retrieves the value of a location in memory and increments the value stored in the location in memory. In the example method of FIG. 8, a compute node (102a) that has failed to execute the parallel application can initiate such a fetch-and-add atomic operation.

Consider an example in which the exit status of particular compute node (102a) is '5,' indicating that the compute node (102a) has failed to execute the parallel application. Assume that the interim aggregated exit status for the subset of compute nodes in the parallel computer (100), which is managed by the job leader compute node (608) is '0,' which indicates that no other compute nodes have failed. In such an example, the compute node (102a) may initiate an fetch-and-load atomic operation. The fetch-and-load atomic operation will retrieve the interim aggregated exit status of '0' from the job leader compute node (608), thereby alerting the compute node (102a) that it is the first compute node to fail, and will also increment the value of the interim aggregated exit status value stored in the job leader compute node (608) to a value of '1.' As such, any additional compute nodes that subsequently fail to execute the parallel application will retrieve a value of greater than '0,' thereby that such a compute node is not the first compute node to fail. Because the fetch-and-load operation is atomic, software executing on the job leader compute node (608) does not need to be interrupted.

The example method of FIG. 8 also includes broadcasting (804), by the parallel computer control system (600) to all compute nodes (102a, 102b, 102c) in the subset of compute nodes, a termination message (802). In the example method of FIG. 8, once the parallel computer control system (600) has received a failure message (710) from one or more compute nodes (102a, 102b, 102c) executing the parallel application, the parallel computer control system (600) determines that at least one compute node (102a, 102b, 102c) executing the parallel application has experienced an error. As such, there may be no need for all other compute nodes to continue executing the parallel application. The parallel computer control system (600) may therefore broadcast (804) a termination message (802) to all compute nodes (102a, 102b, 102c) in the subset of compute nodes. The termination message (804) of FIG. 8 represents an instruction that causes any recipient to cease executing the parallel application. The termination message (804) may include, for example, an identification of the first compute node to experience an error while executing the parallel application, an identifier for the parallel application, an error code containing information describing the error that was encountered by another compute node, and so on.

The example method of FIG. 8 also includes ceasing (808) execution of the parallel application by a compute node (102a, 102b, 102c) in response to receiving the termination message (802) by the compute node (102a, 102b, 102c). In the example method of FIG. 8, ceasing (808) execution of the parallel application by a compute node (102a, 102b, 102c) may include sending an exit status to the job leader compute node (608) indicating that execution of the parallel application was forcibly terminated, sending execution parameters to the job leader compute node (608) that identify the state of the parallel application at the time that execution was halted, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of aggregating job exit statuses of a plurality of compute nodes executing a parallel application, the method comprising:
   identifying, by a parallel computer control system, a subset of compute nodes in the parallel computer to execute the parallel application;
   selecting, by the parallel computer control system, one compute node in the subset of compute nodes in the parallel computer as a job leader compute node;
   initiating, by the parallel computer control system, execution of the parallel application on the subset of compute nodes;
   receiving, by the job leader compute node, an exit status from each compute node in the subset of compute nodes, wherein the exit status for each compute node includes information describing execution of some portion of the parallel application by the compute node;
   aggregating, by the job leader compute node, each exit status from each compute node in the subset of compute nodes; and
   sending, by the job leader compute node to the parallel computer control system, an aggregated exit status for the subset of compute nodes in the parallel computer.

2. The method of claim 1 further comprising:
   determining, by a compute node in the parallel computer, whether execution of some portion of the parallel application on the compute node has failed; and
   responsive to determining that execution of some portion of the parallel application on the compute node has failed:
      sending, by the compute node to the job leader compute node, an exit status for the compute node;
      determining, by the compute node, whether execution of another portion of the parallel application has failed on another compute node in the subset of compute nodes; and
      responsive to determining that execution of another portion of the parallel application has not failed on another compute node, sending, from the compute node to the parallel computer control system, a failure message.

3. The method of claim 2 wherein determining, by the compute node, whether execution of another portion of the parallel application has failed on another compute node in the subset of compute nodes further comprises receiving, by the compute node, an interim aggregated exit status for the subset of compute nodes in the parallel computer.

4. The method of claim 3 wherein the interim aggregated exit status for the subset of compute nodes in the parallel computer is received by the compute node as the result of a fetch-and-add atomic operation initiated by the compute node.

5. The method of claim 2 further comprising:
   broadcasting, by the parallel computer control system to all compute nodes in the subset of compute nodes, a termination message; and responsive to receiving the termination message by a particular compute node, ceasing execution of the parallel application by the particular compute node.

6. The method of claim 1 wherein an exit status for a compute node is zero when the compute node has executed some portion of the parallel application without experiencing an error.

7. The method of claim 1 wherein an exit status for a compute node is not zero when the compute node has experienced an error while executing some portion of the parallel application.

8. An apparatus for aggregating job exit statuses of a plurality of compute nodes executing a parallel application, the apparatus comprising a computer processor, a computer memory operatively coupled to the computer processor, the computer memory having disposed within it computer program instructions that, when executed by the computer processor, cause the apparatus to carry out the steps of:
identifying, by a parallel computer control system, a subset of compute nodes in the parallel computer to execute the parallel application;
selecting, by the parallel computer control system, one compute node in the subset of compute nodes in the parallel computer as a job leader compute node;
initiating, by the parallel computer control system, execution of the parallel application on the subset of compute nodes;
receiving, by the job leader compute node, an exit status from each compute node in the subset of compute nodes, wherein the exit status for each compute node includes information describing execution of some portion of the parallel application by the compute node;
aggregating, by the job leader compute node, each exit status from each compute node in the subset of compute nodes; and
sending, by the job leader compute node to the parallel computer control system, an aggregated exit status for the subset of compute nodes in the parallel computer.

9. The apparatus of claim 8 further comprising computer program instructions that, when executed by the computer processor, cause the apparatus to carry out the steps of:
determining, by a compute node in the parallel computer, whether execution of some portion of the parallel application on the compute node has failed; and
responsive to determining that execution of some portion of the parallel application on the compute node has failed:
sending, by the compute node to the job leader compute node, an exit status for the compute node;
determining, by the compute node, whether execution of another portion of the parallel application has failed on another compute node in the subset of compute nodes; and
responsive to determining that execution of another portion of the parallel application has not failed on another compute node, sending, from the compute node to the parallel computer control system, a failure message.

10. The apparatus of claim 9 wherein determining, by the compute node, whether execution of another portion of the parallel application has failed on another compute node in the subset of compute nodes further comprises receiving, by the compute node, an interim aggregated exit status for the subset of compute nodes in the parallel computer.

11. The apparatus of claim 10 wherein the interim aggregated exit status for the subset of compute nodes in the parallel computer is received by the compute node as the result of a fetch-and-add atomic operation initiated by the compute node.

12. The apparatus of claim 9 further comprising computer program instructions that, when executed by the computer processor, cause the apparatus to carry out the steps of:
broadcasting, by the parallel computer control system to all compute nodes in the subset of compute nodes, a termination message; and
responsive to receiving the termination message by a particular compute node, ceasing execution of the parallel application by the particular compute node.

13. The apparatus of claim 8 wherein an exit status for a compute node is zero when the compute node has executed some portion of the parallel application without experiencing an error.

14. The apparatus of claim 8 wherein an exit status for a compute node is not zero when the compute node has experienced an error while executing some portion of the parallel application.

15. A computer program product for aggregating job exit statuses of a plurality of compute nodes executing a parallel application, the computer program product disposed upon a computer readable medium, the computer program product comprising computer program instructions that, when executed, cause a computer to carry out the steps of:
identifying, by a parallel computer control system, a subset of compute nodes in the parallel computer to execute the parallel application;
selecting, by the parallel computer control system, one compute node in the subset of compute nodes in the parallel computer as a job leader compute node;
initiating, by the parallel computer control system, execution of the parallel application on the subset of compute nodes;
receiving, by the job leader compute node, an exit status from each compute node in the subset of compute nodes, wherein the exit status for each compute node includes information describing execution of some portion of the parallel application by the compute node;
aggregating, by the job leader compute node, each exit status from each compute node in the subset of compute nodes; and
sending, by the job leader compute node to the parallel computer control system, an aggregated exit status for the subset of compute nodes in the parallel computer.

16. The computer program product of claim 15 further comprising computer program instructions that, when executed, cause the computer to carry out the steps of:
determining, by a compute node in the parallel computer, whether execution of some portion of the parallel application on the compute node has failed; and
responsive to determining that execution of some portion of the parallel application on the compute node has failed:
sending, by the compute node to the job leader compute node, an exit status for the compute node;
determining, by the compute node, whether execution of another portion of the parallel application has failed on another compute node in the subset of compute nodes; and
responsive to determining that execution of another portion of the parallel application has not failed on another compute node, sending, from the compute node to the parallel computer control system, a failure message.

17. The computer program product of claim 16 wherein determining, by the compute node, whether execution of another portion of the parallel application has failed on another compute node in the subset of compute nodes further comprises receiving, by the compute node, an interim aggregated exit status for the subset of compute nodes in the parallel computer.

18. The computer program product of claim 16 further comprising computer program instructions that, when executed, cause the computer to carry out the steps of:
   broadcasting, by the parallel computer control system to all compute nodes in the subset of compute nodes, a termination message; and
   responsive to receiving the termination message by a particular compute node, ceasing execution of the parallel application by the particular compute node.

19. The computer program product of claim 15 wherein an exit status for a compute node is zero when the compute node has executed some portion of the parallel application without experiencing an error.

20. The computer program product of claim 15 wherein an exit status for a compute node is not zero when the compute node has experienced an error while executing some portion of the parallel application.

* * * * *